United States Patent [19]

Ott et al.

[11] Patent Number: 4,657,976

[45] Date of Patent: * Apr. 14, 1987

[54] MOULDING COMPOSITIONS OF VINYL CHLORIDE POLYMERS, GRAFT POLYMERS AND POLYMERIC PLASTICIZERS HAVING A HIGH RESISTANCE TO AGEING

[75] Inventors: Karl-Heinz Ott, Leverkusen; Christian Lindner, Cologne; Walter Uerdingen, Leverkusen; Hans-Eberhard Braese, Cologne; Helmut Hurnik, Leverkusen, all of Fed. Rep. of Germany

[73] Assignee: Bayer Aktiengesellschaft, Leverkusen, Fed. Rep. of Germany

[*] Notice: The portion of the term of this patent subsequent to May 21, 2002 has been disclaimed.

[21] Appl. No.: 516,572

[22] Filed: Jul. 25, 1983

[30] Foreign Application Priority Data

Aug. 4, 1982 [DE] Fed. Rep. of Germany ....... 3229079

[51] Int. Cl.$^4$ .................... C08L 27/06; C08L 51/04

[52] U.S. Cl. ......................... 525/83; 525/80; 525/84; 525/227; 525/230; 525/239; 525/64; 525/190; 525/86

[58] Field of Search ............ 525/83, 239, 84, 64

[56] References Cited

U.S. PATENT DOCUMENTS

| | | | |
|---|---|---|---|
| 3,678,132 | 7/1972 | Isogawa et al. | 525/83 |
| 3,772,409 | 9/1971 | Scarso et al. | 525/84 |
| 4,234,703 | 11/1980 | Lindsay | 525/239 |
| 4,413,092 | 11/1983 | Witschard | 525/239 |
| 4,518,515 | 5/1985 | Ott et al. | 525/83 |

FOREIGN PATENT DOCUMENTS

| | | |
|---|---|---|
| 2011501 | 4/1982 | France . |
| 42-5096 | 3/1967 | Japan ................. 525/84 |
| 976360 | 3/1970 | United Kingdom . |

Primary Examiner—Wilbert J. Briggs, Sr.
Attorney, Agent, or Firm—Connolly & Hutz

[57] ABSTRACT

This invention relates to thermoplastic moulding compositions of vinyl chloride polymers, certain graft polymers, certain resin-like copolymer additives and certain rubber-like copolymers for the production of films having improved resistance to ageing.

3 Claims, No Drawings

MOULDING COMPOSITIONS OF VINYL CHLORIDE POLYMERS, GRAFT POLYMERS AND POLYMERIC PLASTICIZERS HAVING A HIGH RESISTANCE TO AGEING

This invention relates to thermoplastic moulding compositions of vinyl chloride polymers, certain graft polymers, certain resin-like copolymer additives and certain rubber-like copolymers for the production of films having improved resistance to ageing.

Vinyl chloride polymers, particularly polyvinyl chloride (PVC), are widely used starting materials for the production of a variety of plastics articles. It is known that the characteristic property spectrum of vinyl chloride polymers may be varied or modified within wide limits by combination with other substances. Thus, unmodified or only slightly modified PVC moulding compositions (so-called "rigid PVC"), for example, are suitable for the production of mouldings. These moulding compositions show average processing properties, average dimensional stability to heat, moderate toughness and relatively poor flexibility. By combining polyvinyl chloride, for example, with so-called plasticisers of low or medium molecular weight, it is possible to produce plastics articles ("flexible PVC") which show high flexibility and elasticity at the use temperatures thereof. The plasticisers used include, for example, phthalates, epoxide compounds, aliphatic diesters, phosphates, polyesters having molecular weights of up to 3000, trimellitates, citrates or certain aliphatic, optionally chlorinated, hydrocarbons. These plasticisers are known (see, for example, "Encyclopedia of PVC", Mariel Dekker, Inc., New York, 1976).

In addition, combinations of so-called polymeric plasticisers (polymers of relatively high molecular weights) with vinyl chloride polymers may be used for the production of flexible PVC mouldings having improved mechanical properties, for example improved abrasion resistance, elasticity, solvent resistance and, optionally, better flame resistance. Polymeric plasticisers of the type in question are, for example partially cross-linked butadiene/acrylonitrile copolymers containing up to 30% by weight, of acrylonitrile and having Mooney viscosities (ML 4, 100° C. (DIN 53 523)) of from 60 to 100 (cf., for example, EP 0 005 736), certain polyurethanes (German Pat. No. 1,193,241) and certain ethylene/vinyl acetate copolymers soluble in organic solvents (cf. for example, EP-A 0 005 736).

Plastic blends of high notched impact strength may be obtained by combining vinyl chloride polymers, for example, with graft polymers (for example styrene, α-methyl styrene, acrylonitrile and/or methyl methacrylate grafted onto rubber-like substrates, such as butadiene polymers or acrylate rubbers) or with graft copolymers (vinyl chloride grafted onto certain ethylene/vinyl acetate copolymers containing, for example, 45% by weight of vinyl acetate and 55% by weight of ethylene) or with other polyethylene derivatives.

The rubber components of the graft polymer modifiers are preferably of a different character (compared with some of the polymeric plasticisers mentioned above) from the rubbers which may be used as polymeric plasticisers. These differences may be attributable, for example, to chemical composition, to the cross-linking characteristics, to particle morphology and to the grafting characteristic.

In addition, the thermal stability under load of vinyl chloride polymers may be improved by certain modifiers, such as copolymers of styrene, α-methyl styrene, acrylonitrile and methyl methacrylate.

To enable these various polymer combinations to be processed on a commercial scale, the systems have to be effectively stabilised, for example against thermal, photolytic and chemical degradation. Suitable stabilisers and processing aids are, for example, Ba/Cd-, Pb-, Sn-, Zn-stabilisers or organic stabilisers and also phenolic, optionally S- or P-containing oxidation inhibitors, epoxide compounds, waxes, low molecular weight and high molecular weight lubricants. Additives which optimise the processing conditions of the particular system are also necessary. Such auxiliaries and the processing conditions are described, for example, in "Kunststoff Handbuch" Carl Hanser Verlag, Munich (1963).

specialised applications (for example as laminating films) call for compositions containing vinyl chloride polymers which are capable of meeting specific demands: a combination of toughness, break resistance, flexibility, elasticity (even at relatively low temperatures), thermal stability under load, abrasion resistance, bond strength; an ability to be processed to form sheet-like materials by extrusion, calendering, injection moulding, deep drawing; laminatability with other materials. In addition, the compositions are required to show high resistance to migration, dimensional stability and particular shrinkage properties. They are also required to have an aesthetic surface appearance and to be able to be processed by specialised surface treatment techniques to form articles having a decorative appearance. In addition, materials of the type in question should have a comfortable feel.

This complex set of requirements may be satisfied by subjecting the following composition, for example, to thermoplastic processing in certain quantitative ratios:
vinyl chloride polymer (for example PVC),
low molecular weight plasticiser (for example dioctyl adipate or phthalates),
graft polymer (for example ABS-graft polymer),
polymeric plasticisers (for example butadiene/acrylonitrile rubbers)
and a complex range of stabilisers for the various components and for the mixture as a whole.

Polymer compositions of this type have disadvantages in terms of practical application which limit the scope of application of mouldings produced therefrom (for example as films). The disadvantages in question are, for example, inadequate resistance to the ageing effects of light, heat, chemicals, other foreign media and also possible chemical interactions between the various components. The resulting ageing is reflected in a loss of mechanical and visual properties (embrittlement, colour deterioration, exudation).

It has now been found that films having improved resistance to ageing may be produced from certain thermoplastic moulding compositions which satisfy the complex set of performance requirements mentioned above.

Accordingly, the present invention relates to thermoplastic moulding compositions containing:
(A) from 25 to 50 parts, by weight, of a vinyl chloride homo- or co-polymer containing at least 50%, by weight, of vinyl chloride;
(B) from 25 to 50 parts, by weight, of a mixture of:
(B)(1) : a graft polymer produced by the graft polymerisation of:

(B)(1.1): from 30 to 95 parts, by weight, of a monomer mixture of styrene, methyl methacrylate, α-methyl styrene, either individually or in admixture, on the one hand, and acrylonitrile, on the other hand, in a weight ratio of from 90:10 to 60:40; onto (B)(1.2): from 70 to 5 parts, by weight, of a butadiene homo- or co-polymer containing ≦35%, by weight, of comonomer and having a gel content of ≧50%, the actual graft rubber having an average particle size of from 0.05 to 5μ; and (B)(2): a copolymer containing α-methyl styrene, styrene, acrylonitrile and/or methyl methacrylate being used as comonomers and the copolymers containing ≧30%, by weight, of incorporated α-methyl styrene;

(C) from 0 to 10 parts, by weight, of a resin-like, thermoplastic copolymer of a styrene/acrylonitrile or methyl methacrylate/acrylonitrile copolymer which has a Staudinger index [η] of ≧3 (dl)/g, preferably ≧4 (dl)/g, and of which the [η]-value is in any case higher than that of the copolymer present in the basic polymer (B);

(D) from 5 to 40 parts, by weight, of a copolymer produced from:

(D)(1): an ethylene/vinyl acetate or an ethylene/acrylic ester copolymer containing ≧50%, by weight, of polar components and having average molecular weights of ≧1500; and/or (D)(2): an ethylene/vinyl acetate/carbon monoxide terpolymer containing ≧20%, by weight, of polar components and having average molecular weights of ≧1500; and/or (D)(3): a copolymer of:

(D)(3.1): from 10 to 99.9 parts, by weight, of an acrylic ester of a $C_1-C_{15}$ alcohol;

(D)(3.2): from 0 to 90 parts, by weight, of at least one polyfunctional monomer containing double bonds in the molecule; and, optionally, (D)(3.3): up to 40%, by weight, based on the sum of (D) (3.1) and (D) (3.2), of one or more comonomers, such as acrylonitrile, vinyl acetate and/or methacrylic acid alkyl esters of $C_1-C_8$ alcohols having average molecular weights of ≧1500; and (E) from 3 to 30 parts, by weight, of:

(E)(1): a copolymer produced from:

(E)(1.1): from 60 to 95 parts, by weight, of a monomer containing 2 conjugated olefinic double bonds and/or of an acrylic ester of a $C_1-C_6$ alcohol;

(E)(1.2): from 5 to 40 parts, by weight, of styrene and/or acrylonitrile and/or methacrylic acid methyl ester; (optionally)

(E)(1.3): up to 10 parts, by weight, of a polyfunctional monomer or polymer containing double bonds; and (E)(1.4): up to 30 parts, by weight, of one or more other comonomers, such as vinyl acetate, (meth)acrylic acid or vinyl ethers; component (E) (1) being different (in at least one parameter) from component (D) (3) and the copolymer (E) (1) having a gel content of ≧70%; and/or (E)(2): an ethylene/propylene terpolymer rubber having gel contents of ≧50%.

Preferred moulding compositions contain from 25 to 50 parts, by weight, of component (A); from 25 to 50 parts, by weight, of component (B); from 1.5 to 3 parts, by weight, of component (C); from 15 to 35 parts, by weight, of component (D); and from 5 to 20 parts, by weight, of component (E).

The Staudinger index of component (C) is measured in dimethyl formamide at 25° C.

The copolymers of component (D) (3) are generally uncrosslinked or partially cross-linked.

Differentiating parameters for components (E) (1) include, for example, chemical composition, cross-linking, gel content.

Vinyl chloride polymers (A) in the context of the present invention are, preferably, polyvinyl chloride, copolymers of vinyl chloride with up to 50%, by weight, preferably up to 20%, by weight, of one or more copolymerisable compounds and also graft polymers of vinyl chloride on ethylene/vinyl acetate copolymers (for example having vinyl acetate contents of 50%, by weight). Compounds copolymerisable with vinyl chloride are, for example vinyl esters of carboxylic acids containing from 1 to 8 carbon atoms in the alkyl moiety, vinyl ethers containing from 3 to 7 carbon atoms, maleic acid anhydride, semi- and di-esters of maleic acid with aliphatic alcohols containing from 1 to 8 carbon atoms in the alcohol moiety.

According to the present invention, the polymers (B) (1) are graft products produced by the graft polymerisation of:

(1) from 30 to 95 parts, by weight, preferably from 60 to 95 parts, by weight, of a styrene, methyl methacrylate or α-methyl styrene/acrylonitrile monomer mixture in a weight ratio of from 90:10 to 60:40, preferably from 75:25 to 65:35, (monomer mixtures containing no methyl methacrylate and no α-methyl styrene are particularly preferred); onto (2) from 70 to 5 parts, by weight, preferably from 10 to 50 parts, by weight, of a butadiene homo- or copolymer containing ≧35%, by weight, of comonomer and having gel contents of ≧50%, preferably ≧80%, the actual graft rubber having an average particle size ($d_{50}$-value) of from 0.05 to 5μ, preferably from 0.1 to 0.5μ. (Graft polymers on highly cross-linked butadiene homopolymers having a particle size of from 0.3 to 0.5μ are particularly preferred).

The α-methyl styrene-containing copolymer (B) (2) of component (B) consists of at least 30%, by weight, preferably at least 45%, by weight, of α-methyl styrene and of up to 70%, by weight, preferably up to 30%, by weight, of one or more copolymerisable monomers, such as acrylonitrile, styrene, chlorostyrene, divinyl benzene, $C_1-C_6$ alkyl methacrylates, phenyl methacrylate, vinyl acetate, maleic acid anhydride and vinyl alkyl ethers. These monomers may contain up to 70%, by weight, preferably up to 55%, by weight, of acrylonitrile, optionally in admixture with styrene and methyl methacrylate.

The copolymers of component (B) (2) should preferably have a glass transition temperature of at least as high as that of the vinyl chloride polymer of component (A) or that of the graft polymers of the graft product (B) (1) or that of the thermoplastic resins (C).

α-methyl styrene resins having higher glass transition temperatures than the above-mentioned components of the moulding compositions, for example α-methyl styrene/acrylonitrile copolymers in a weight ratio of from 68:32 to 72:28 are particularly preferred.

Resin-like, thermoplastic copolymers (C) in the context of the present invention are styrene/acrylonitrile copolymers and methyl methacrylate/acrylonitrile copolymers which have a Staudinger index [η] of ≧3 (dl)/g, preferably ≧4 (dl)/g. However, the Staudinger indices of this thermoplastic component should in any case be higher than the Staudinger indices of the copolymers present in the basic polymer (B) (i.e. the resin components present in the graft copolymer). Methyl methacrylate/acrylonitrile copolymers containing from 5 to 50%, by weight, of incorporated acrylonitrile are particularly suitable for use as component (C). Particularly preferred polymers (C) consist of from 25 to 40%, by weight, of acrylonitrile and from 85 to 60%, by weight, of methyl methacrylate. They have an uncross-linked structure (as reflected in the solubility thereof in suitable organic solvents, for example dimethyl formamide (DMF)). They may optionally contain relatively small amounts of methacrylic acid esters of $C_2$-$C_8$ alcohols and of acrylic acid esters of $C_1$-$C_6$ alcohols.

Component (D) (3) of the compositions according to the present invention consists of copolymers of:

(D)(3.1) from 10 to 99.9 parts, by weight, preferably from 70 to 99.9 parts, by weight, of at least one acrylic ester of a $C_1$-$C_{15}$ alcohol, preferably an aliphatic alcohol. Particular preference is attributed to butyl acrylate, hexyl acrylate, methyl acrylate and ethyl acrylate; butyl acrylate and ethyl hexyl acrylate are especially preferred;

(D)(3.2) from 0 to 90 parts, by weight, preferably from 0 to 30 parts, by weight, of at least one polyfunctional monomer containing double bonds in the molecule, for example divinyl benzene, alkylene di(meth)acrylate, triallyl (iso)cyanurate, butadiene, isoprene and allyl(meth)acrylate; and, optionally (D)(3.3) up to 40%, by weight, preferably up to 30%, by weight, based on the sum of (D) (3.1) and (D) (3.2), of one or more other comonomers, such as acrylonitrile, vinyl acetate and/or methacrylic acid alkyl esters of $C_1$-$C_8$ alcohols, such as methyl methacrylate and vinyl acetate.

These copolymers may be cross-linked or partially cross-linked. The soluble parts of the copolymer should have molecular weights of from 1000 to 2,000,000, preferably $\geq$20,000. Particularly preferred copolymers of component (D) consist of from 5 to 35 parts, by weight, of acrylonitrile, optionally in admixture with methyl methacrylate and/or vinyl acetate, from 85 to 65 parts, by weight, of butyl acrylate, optionally in admixture with ethyl hexyl acrylate, and from 0 to 10 parts, by weight, of polyfunctional monomers. These products are preferably partially cross-linked and have gel contents of $\geq$30% and swelling indices, as measured in dimethyl formamide (DMF), of from 10 to 60, preferably from 15 to 40.

Component (D) (1) may also consist of ethylene/vinyl acetate or/acrylic ester copolymers containing $\geq$50%, preferably $\geq$60%, of polar components and having average molecular weights of $\geq$1500, preferably $\geq$10,000, more preferably $\geq$100,000.

Ethylene/vinyl acetate/carbon monoxide terpolymers containing $\geq$20% of polar components are also suitable for use as component (D) (2).

Component (E) (2) of the compositions according to the present invention is an ethylene/propylene terpolymer rubber generally with one or more unconjugated diene monomers, such as ethylidene norbornene, dicyclopentadiene or 1,4-hexadiene, as termonomer. Such a rubber should advantageously be present in cross-linked form (gel contents $\geq$50%, by weight).

Other suitable components (E) of the compositions according to the present invention are copolymers of:

(E)(1.1) from 60 to 95 parts, by weight, preferably from 65 to 85 parts, by weight, of a monomer containing 2 conjugated, olefinic double bonds, for example butadiene, isoprene or chloroprene, and/or of an acrylic ester of a $C_1$-$C_6$ alcohol, for example ethyl, butyl or hexyl acrylate;

(E)(1.2) from 5 to 40 parts, by weight, preferably from 15 to 35 parts, by weight, of styrene and/or acrylonitrile and/or methacrylic acid methyl ester; (optionally)

(E)(1.3) up to 10 parts, by weight, of a cross-linking polyfunctional oligomer or polymer containing double bonds; and (E)(1.4) up to 30 parts, by weight, of one or more other comonomers, such as vinyl acetate, (meth)acrylic acid, vinyl ethers and methoxy methacrylamide, preferably vinyl acetate.

Such copolymers should preferably have gel contents of $\geq$70% and should differ from copolymer (D) (3) in at least one parameter (for example chemical composition, cross-linking, gel content, swelling index.

Preferred copolymers are copolymers of from 20 to 35 parts, by weight, of acrylonitrile and from 80 to 65 parts, by weight, of butadiene, having gel contents of $\geq$70% or copolymers of from 15 to 35 parts, by weight, of acrylonitrile, from 85 to 65 parts, by weight, of acrylic acid alkyl ester and from 0.4 to 10 parts, by weight, of a cross-linking agent (in the form of a polyfunctional vinyl or allyl monomer, butadiene, isoprene, diene oligomers, polydienes, $C_2$-$C_{30}$ alkylenes containing terminal polymerisable groups, such as (meth)-acrylic acid esters or polybutadiene nuclei in cross-linked form onto which alkyl acrylate has been grafted in admixture with acrylonitrile). These preferred copolymers may contain incorporated vinyl acetate.

Component (E) (1) should differ from component (D) (3) in at least one parameter.

The different effects of components (E) (1) and (D) (3) in the compositions according to the present invention may be obtained, for example, by the chemical composition and the degree of cross-linking (or non-cross-linking), as expressed by the gel content, swelling index and the molecular weight of the soluble part.

If components (D) and (E) are present in cross-linked particulate form, the particle size thereof also plays a certain part in certain product compositions, for example in regard to the effect of component (E).

Components (D) and (E) of the moulding compositions according to the present invention may, of course, also be used for producing the moulding compositions according to the present invention when they are present as certain graft polymers (for example graft polymers of the vinyl chloride polymers forming component (A) on polymers (D) and (E) as the graft base).

The vinyl chloride polymers suitable for use in accordance with the present invention may be produced by known methods (for example emulsion, suspension or mass polymerisation).

The polymers suitable for use in accordance with the present invention may be produced by emulsion, suspension or precipitation polymerisation processes. Particularly suitable processes are emulsion polymerisation or combinations of emulsion and suspension polymerisation.

Particularly preferred polymers are obtained by initially subjecting a butadiene (copolymer) rubber to radical polymerisation in aqueous emulsion (in the presence of emulsifiers, radical-formers, regulators,) to form an aqueous latex having a latex particle size of from 0.05 to 5μ (optionally in combination with known latex particle agglomeration processes) and then polymerising the vinyl monomers mentioned (for example styrene, acrylonitrile and methyl methacrylate) in a second stage in the presence of this rubber latex.

On completion of the graft polymerisation reaction, stabilisers (for example of the phenol type) are added.

The polymers may be isolated by known methods, for example by coagulation using electrolytes, acids or organic solvents. The products may then be freed from water by drying.

The copolymers (B) (2) suitable for use in accordance with the present invention may be produced for example using resins obtained by emulsion or mass polymerisation. After such polymerisation reactions, oxidation inhibitors (for example of the phenol type) may optionally be added. The polymers may be isolated (for example in the form of powders), from the graft polymer latices by known methods, for example by coagulation by the addition of electrolytes, acids or organic solvents. The crude products may be freed from water, for example by drying.

The thermoplastic additives (C) suitable for use in accordance with the present invention may be produced by emulsion or suspension processes in the presence of known surface-active substances and initiators, for example radical-formers. Such polymers may either by isolated from the latex accumulating (for example by spray drying) or alternatively the latices of the composition constituents according to the present invention may be mixed and coagulated together, for example, with the ABS-latex and/or with the butadiene/acrylonitrile latex (component (E)) and/or with latices of the ethylene polymers (D) providing they are obtainable in latex form.

Such so-called co-coagulation processes give particularly preferred component mixtures (as constituents of the composition according to the present invention). They are moulding compositions having particularly favourable properties.

Component (D) of the compositions according to the present invention may be produced in known manner by radical copolymerisation processes (for example emulsion, solution, mass or suspension polymerisation and combinations of emulsion and suspension polymerisation). A combination of aqueous emulsion polymerisation with solution polymerisation is particularly preferred. After production, the polymers may be isolated by known methods (for example by filtration, coagulation, evaporation, preferably by the coagulation of emulsions).

As with the other components of the moulding compositions according to the present invention, the individual components may be treated and stabilised during or after production with conventional oxidation inhibitors, heat stabilisers or light stabilisers.

Component (E) of the compositions according to the present invention is preferably prepared in such a way that the material may readily be cross-linked to gel contents of ≧70%. One preferred process for producing component (E) is, for example, emulsion polymerisation (for example in aqueous media). In other production processes, it is possible, for example, to carry out solution polymerisation (to form a substantially uncross-linked material) and then to bring about the necessary cross-linking by the action of cross-linking agents (with or without dispersion of the precondensate obtained by solution polymerisation). In such processes, conventional radical-formers and also suitable light sources may be used.

One particularly suitable process is aqueous emulsion polymerisation, followed by coagulation of the aqueous latices accumulating.

The moulding compositions according to the present invention may be processed by the methods normally used for processing plastics. For example, mouldings may be produced by injection moulding, extrusion, blow forming, deep drawing and calendering. The moulding compositions are particularly suitable for the production of films. The mouldings show improved dimensional stability to heat and may therefore be exposed to fairly severe thermal stressing.

The intrinsic viscosities (Staudinger indices) were determined in the particular solvent indicated. For definitions of the Staudinger index, swelling index and gel content, see M. Hoffmann, H. Kromer, R. Kuhn, "Polymeranalytik I und II" Georg Thieme Verlag, (Stuttgart (1977)).

The graft rubber particle sizes are $d_{50}$(diameter)-values determined by ultracentrifuge measurements (cf. W. Scholtan, H. Lange, Kolloidz. und Z. Polymere 250 (1972), 783 to 796).

EXAMPLES

For producing the moulding compositions described in Table 2, x parts, by weight, of polyvinyl chloride (K-value 70) are combined with various quantities of different products (Table 1). In each case, 2%, by weight, of Ba/Cd-laurate (solid), 0.3%, by weight, of sterically hindered, phenolic oxidation inhibitor (solid) and 0.2%, by weight, of ester wax are added for stabilisation and lubrication. The moulding compositions are homogenised on mixing rolls for 10 minutes at 180° C. and moulded at 190° C. to form test specimens.

TABLE 1

| | Polymers used |
|---|---|
| Product 1.1: | A mixture of 94 parts, by weight of an acrylonitrile/butadiene/styrene (ABS) polymer and 6 parts, by weight, of a methyl methacrylate/acrylonitrile copolymer containing 32%, by weight, of acrylonitrile and having a Staudinger index of 5 dl/g (in DMF at 25° C.); the ABS-polymer produced by emulsion polymerisation, contains 30%, by weight, of polybutadiene having a gel content of 70% and a particle size of 0.4μ. |
| Product 1.2: | The polymer consists of 31%, by weight, of α-methyl styrene and 69%, by weight, of acrylonitrile and has a Staudinger index, as measured in dimethyl formamide (DMF) at 25° C. of 0.74. |
| Product 1.3: | The polymer consists of 25%, by weight, of an ABS-polymer and 75 parts, by weight, of an α-methyl styrene copolymer having the same composition as product 1.2; the ABS—polymer consists of 50 parts, by weight, of styrene/acrylonitrile (SAN)—resin and of 50 parts, by weight, of a polybutadiene having rubber particle size of 0.4μ. |
| Product 1.4: | The polymer consists of 10 parts, by weight, of acrylonitrile, 55.5 parts, by weight, of methyl methacrylate and 34.5 parts, by weight of α-methyl styrene and has a Staudinger index, in DMF at 25° C., of 0.58. |
| Product 1.5: | The polymer consists of 70%, by weight, of vinyl acetate and 30%, by weight, of ethylene and has an average molecular weight of 200,000. |
| Product 1.6: | The polymer consists of 6%, by weight, of carbon monoxide, 24%, by weight, of vinyl |

TABLE 1-continued

Polymers used

| | |
|---|---|
| | acetate and 70%, by weight, of ethylene and has an average molecular weight of 150,000. |
| Product 1.7: | Emulsion polymerisation at 65° C. in accordance with the following general formulation gives a latex from which a rubber-like polymer is obtained by coagulation with MgSO$_4$: |
| | 2950 parts, by weight, of water |
| | 35 parts, by weight, of Na—C$_{14}$-C$_{16}$ alkyl-sulphonate |
| | 2 parts, by weight, of potassium peroxydisulphate |
| | 1.0 part, by weight, of triallyl cyanurate |
| | 158 parts, by weight, of acrylonitrile |
| | The polymer has a gel content of 63% (in DMF) and a swelling index of 40. |
| Product 1.8: | Emulsion polymerisation at 65° C. in accordance with the following general formulation gives a latex from which a rubber-like polymer is obtained by coagulation with MgSO$_4$: |
| | 2585 parts, by weight, of water |
| | 27 parts, by weight, of C$_{14}$-C$_{16}$ alkyl sulphonates |
| | 2 parts, by weight, of potassium peroxydisulphate |
| | 1182 parts, by weight, of butyl acrylate |
| | 393 parts, by weight, of acrylonitrile |
| | 4 parts, by weight of triallyl cyanurate. |
| | The polymer has a gel content (in DMF) of 92% and a swelling index of 19.8. |
| Product 1.9: | The polymer consists of 29%, by weight, of acrylonitrile and 71%, by weight, of butadiene, is an emulsion polymer and has a gel content of ≧70%. |

TABLE 2

| Example 1 | | Example 2 | | Example 3 | | Example 4 | | Example 5 | |
|---|---|---|---|---|---|---|---|---|---|
| Prod. | PBW* | Prod. | PBW | Prod. | PBW | Prod. | PBW | Prod. | PBW |
| PVC | 30 | PVC | 30 | PVC | 30 | PVC | 30 | PVC | 30 |
| 1.1 | 25 | 1.1 | 25 | 1.1 | 25 | 1.1 | 25 | 1.1 | 25 |
| 1.2 | 15 | 1.2 | 15 | 1.4 | 15 | 1.3 | 15 | 1.4 | 15 |
| IPDI** | 22 | 1.5 | 37 | 1.6 | 35 | 1.7 | 40 | 1.7 | 40 |
| 1.9 | 8 | 1.8 | 8 | 1.8 | 10 | 1.9 | 10 | 1.8 | 10 |

| | Example 1 | Example 2 | Example 3 | Example 4 | Example 5 |
|---|---|---|---|---|---|
| Tensile strength DIN 53455 | 20.7 | 23.7 | 22.1 | 23.2 | 22.7 |
| Elongation % DIN 53455 | 202 | 234 | 226 | 245 | 210 |
| Vicat-value °C. DIN 53460 method A | 86 | 89 | 86 | 92 | 92 |
| Shore hardness D DIN 53505 | 53 | 54 | 54 | 56 | 57 |
| Tear Propagation resistance N/mm DIN 53515 | 62 | 72 | 65 | 78 | 70 |
| Elongation % after ageing (120° C., 21 d) DIN 53455 | 4 | 178 | 155 | 132 | 180 |

*PBW = Parts, by weight
** = diisodecyl phthalate

As may be seen from Table 2, the moulding compositions according to the present invention show outstanding ageing behaviour and also increased dimensional stability to heat (Vicat value).

We claim:

1. A thermoplastic molding composition comprising,
(A) from 25 to 50 parts, by weight, of a vinyl chloride homo- or copolymer containing at least 50% by weight, vinyl chloride;
(B) from 25 to 50 parts, by weight, of a mixture of
(B)(1): a graft polymer produced by the graft polymerization of
(B)(1.1): from 30 to 95 parts, by weight, of a monomer mixture of styrene, methyl methacrylate α-methyl styrene, either individually or in admixture, on the one hand, and acrylonitrile on the other hand, in a ratio of from 90:10 to 60:40; onto
(B)(1.2): from 70 to 5 parts by weight of a butadiene homo- or copolymer containing ≦35%, by weight, of comonomer and having a gel content of ≧50%;
where the graft polymer has an average particle size of from 0.05 to 5μ; and
(B)(2): a copolymer containing α-methyl styrene, styrene, acrylonitrile, methyl methacrylate or a mixture thereof incorporated with ≧30%, by weight, α-methyl styrene;
(C) from 0 to 10 parts, by weight, of a thermoplastic copolymer of styrene/acrylonitrile or methyl methacrylate/acrylonitrile having a Staudinger index, η, ≧3 (dl)/g and where η is higher than the Staudinger index of (B);
(D) from 5 to 40 parts, by weight, of a copolymer selected from
(D)(1): an ethylene/vinyl acetate or an ethylene/acrylic ester copolymer containing ≧50%, by weight, of a polar component and having an average molecular weight of ≧1500;
(D)(2): an ethylene/vinyl acetate/carbon monoxide terpolymer containing ≧20%, by weight, of a polar component and having an average molecular weight of ≧1500;
(D)(3): a copolymer of:
(D)(3.1): from 10 to 99.9 parts, by weight, of an acrylic ester of a C$_1$-C$_{15}$ alcohol;
(D)(3.2): from 0 to 90 parts, by weight, of at least one difunctional or polyfunctional monomer containing conjugated or unconjugated double bonds; and
(D)(3.3): 0 to 40%, by weight, based on the sum of the weights of (D)(3.1) and (D)(3.2), of copolymerizable monomers, where (D)(3) has an average molecular weight $\geq 1500$;

(E) from 3 to 30 parts, by weight, of:
 (E)(1): a copolymer produced from:
  (E)(1.1): 60 to 95 parts, by weight, of a monomer containing two conjugated olefinic double bonds, an acrylic ester of $C_1-C_6$ alcohol or a mixture thereof;
  (E)(1.2): 5 to 40 parts, by weight, of styrene, acrylonitrile, methyl methacrylate or a mixture thereof;
  (E)(1.3): 0 to 10 parts, by weight, of a bifunctional or polyfunctional monomer or polymer containing conjugated or unconjugated double bonds; and
  (E)(1.4): 0 to 30 parts, by weight, of copolymerized monomers;
  copolymer (E)(1) being different from component (D)(3) in at least one parameter and the copolymer (E)(1) having a gel content of $\geq 70\%$;
 (E)(2): an ethylene/propylene terpolymer rubber having a gel content of $\geq 70\%$
 or mixtures thereof.

2. The use of the thermoplastic moulding compositions claimed in claim 1 for the production of films.

3. Thermoplastic molding compositions in accordance with claim 1, wheren the other copolymerizable monomers of (D) (3.3) are acrylonitrile, vinyl acetate, methacrylic acid, alkyl esters of alcohols containing form one to eight carbon atoms or combinations thereof.

* * * * *